US009790425B2

(12) United States Patent
McDaniel

(10) Patent No.: US 9,790,425 B2
(45) Date of Patent: Oct. 17, 2017

(54) SYNTHESIS OF QUANTUM DOTS

(71) Applicant: Los Alamos National Security, LLC, Los Alamos, NM (US)

(72) Inventor: Hunter McDaniel, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 89 days.

(21) Appl. No.: 14/690,152

(22) Filed: Apr. 17, 2015

(65) Prior Publication Data
US 2015/0299567 A1 Oct. 22, 2015

Related U.S. Application Data

(60) Provisional application No. 61/981,309, filed on Apr. 18, 2014.

(51) Int. Cl.
*C09K 11/88* (2006.01)
*H01L 31/0352* (2006.01)

(52) U.S. Cl.
CPC .......... *C09K 11/883* (2013.01); *C09K 11/881* (2013.01)

(58) Field of Classification Search
CPC .............. C09K 11/883; C09K 11/881; H01L 31/035218; Y10S 977/813; Y10S 977/824; Y10S 977/834
See application file for complete search history.

(56) References Cited

U.S. PATENT DOCUMENTS

| 5,777,433 | A | 7/1998 | Lester et al. | |
|---|---|---|---|---|
| 7,892,519 | B2 * | 2/2011 | Pak | C30B 7/14 423/511 |
| 7,955,586 | B2 * | 6/2011 | Jung | H01L 21/02568 423/508 |
| 2005/0107478 | A1 | 5/2005 | Klimov et al. | |
| 2010/0013376 | A1 | 1/2010 | Maskaly et al. | |
| 2010/0276638 | A1 | 11/2010 | Liu et al. | |
| 2013/0134366 | A1 | 5/2013 | Battaglia et al. | |
| 2014/0130864 | A1 | 5/2014 | Lunt et al. | |

FOREIGN PATENT DOCUMENTS

| WO | WO 2004/008550 | * | 1/2004 |
|---|---|---|---|
| WO | WO 2012/163976 | * | 12/2012 |

OTHER PUBLICATIONS

Li et al, "Effe=icient Synthesis of Highly Luminescent Coper Indium Sulfide-Based Core/Shell Nnaocrystals with Surprisingly Long-Lived Emission", J. Am. Chem. Soc; Jan. 2011, 133, pp. 1176-1179.*
McDaniel et al, "Engineered CuInSexS2-x Quntum Dots for Sensitized Solar Cells", J. Phys. Chem. Lett. Jan. 2013, pp. 355-361.*
Draguta et al., "Tuning Carrier Mobilities and Polarity of Charge Transport in Films of CuInSe$_x$S$_{2-x}$ Quantum Dots," *Advanced Materials* 27(10):1701-1705, Jan. 22, 2015.
International Search Report from International Application No. PCT/US2014/060303 dated Feb. 24, 2015.
Koo et al., "Synthesis of CuInSe$_2$ Nanocrystals with Trigonal Pyramidal Shape," *Journal of the American Chemical Society* 131(9):3134-3135, Feb. 13, 2009.
Li et al., "Efficient Synthesis of Highly Luminescent Copper Indium Sulfide-Based Core/Shell Nanocrystals with Surprisingly Long-Lived Emission," *Journal of the American Chemical Society* 133(5) 1176-1179, Jan. 5, 2011.
Liu et al., "Alkylthiol-Enabled Se Powder Dissolution in Oleylamine at Room Temperature for the Phosphine-Free Synthesis of Copper-Based Quaternary Selenide Nanocrystals," *Journal of the American Chemical Society* 134(17):7207-7210, Apr. 19, 2012.
Makarov et al., "Photocharging Artifacts in Measurements of Electron Transfer in Quantum-Dot-Sensitized Mesoporous Titania Films," *Journal of Physical Chemical Letters* 5(1):111-118, Dec. 6, 2013.
McDaniel et al., "Engineered CuInSe$_x$S$_{2-x}$ Quantum Dots for Sensitized Solar Cells," *Journal of Physical Chemical Letters* 4(3):355-361, Jan. 8, 2013.
McDaniel et al., "An integrated approach to realizing high-performance liquid-junction quantum dot sensitized solar cells," *Nature Communications* 4:2887, Dec. 10, 2013.
O'Regan et al., "A low-cost, high-efficiency solar cell based on dye-sensitized colloidal TiO$_2$ films," *Nature* 353:737-740, Oct. 24, 1991.
Panthani et al., "Synthesis of CuInS$_2$, CuInSe$_2$, and Cu(In$_x$Ga$_{1-x}$)Se$_2$ (CIGS) Nanocrystals 'Inks' for Printable Photovoltaics," *Journal of the American Chemical Society* 130(49):16770-16777, Nov. 17, 2008.
Panthani et al., "In Vivo Whole Animal Fluorescence Imaging of a Microparticle-Based Oral Vaccine Containing (CuInSe$_x$Se$_{2-x}$)/ZnS Core/Shell Quantum Dots," *Nano Letters* 13(9):4294-4298, Sep. 11, 2013.
Robel et al., "Universal Size-Dependent Trend in Auger Recombination in Direct-Gap and Indirect-Gap Semiconductor Nanocrystals," *Physical Review Letters* 102(17):177404, May 1, 2009.

(Continued)

Primary Examiner — Carol M Koslow
(74) Attorney, Agent, or Firm — Klarquist Sparkman, LLP

(57) ABSTRACT

Common approaches to synthesizing alloyed quantum dots employ high-cost, air-sensitive phosphine complexes as the selenium precursor. Disclosed quantum dot synthesis embodiments avoid these hazardous and air-sensitive selenium precursors. Certain embodiments utilize a combination comprising a thiol and an amine that together reduce and complex the elemental selenium to form a highly reactive selenium precursor at room temperature. The same combination of thiol and amine acts as the reaction solvent, stabilizing ligand, and sulfur source in the synthesis of quantum dot cores. A non-injection approach may also be used. The optical properties of the quantum dots synthesized by this new approach can be finely tuned for a variety of applications by controlling size and/or composition of size and composition. Further, using the same approach, a shell can be grown around a quantum dot core that improves stability, luminescence efficiency, and may reduce toxicity.

37 Claims, 10 Drawing Sheets

(56) References Cited

OTHER PUBLICATIONS

Stolle et al., "Comparison of the Photovoltaic Response of Oleylamine and Inorganic Ligand-Capped $CuInSe_2$ Nanocrystals," *ACS Applied Materials & Interfaces* 4(5):2757-2761, Apr. 23, 2012.

Stolle et al., "Nanocrystal photovoltaics: a review of recent progress," *Current Opinion in Chemical Engineering* 2:160-167, Apr. 3, 2013.

Tan et al., "Near-Band-Edge Electroluminescence from Heavy-Metal-Free Colloidal Quantum Dots," *Advanced Materials* 23(31):3553-3558, Jul. 6, 2011.

Turo et al., "Crystal-Bound vs Surface-Bound Thiols on Nanocrystals," *ACS Nano* 8(10):10205-10213, Sep. 15, 2014.

Wanger et al., "The Dominant Role of Exciton Quenching in PbS Quantum-Dot-Based Photovoltaic Devices," *Nano Letters* 13(12):5907-5912, Nov. 20, 2013.

Zhang et al., "Facile Synthesis of $ZnS$—$CuInS_2$-Alloyed Nanocrystals for a Color-Tunable Fluorchrome and Photocatalyst," *Inorganic Chemistry* 50(9):4065-4072, Apr. 1, 2011.

Zhong et al., "Tuning the Luminescence Properties of Colloidal I-III-VI Semiconductor Nanocrystals for Optoelectronics and Biotechnology Applications," *Journal of Physical Chemistry Letters* 3(21):3167-3175, Oct. 11, 2012.

* cited by examiner

SYNTHESIS OF QUANTUM DOTS

CROSS REFERENCE TO RELATED APPLICATION

This application claims the benefit of the earlier filing date of U.S. Provisional Application No. 61/981,309, filed Apr. 18, 2014, which is incorporated herein by reference in its entirety.

ACKNOWLEDGMENT OF GOVERNMENT SUPPORT

This invention was made with government support Contract No. DE-AC52-06NA25396 awarded by U.S. Department of Energy. The invention was also supported by the Center for Advanced Solar Photophysics, an Energy Frontier Research Center funded by the U.S. Department of Energy, Office of Science, Office of Basic Energy Sciences. The government has certain rights in the invention.

FIELD

This disclosure concerns nanocrystal quantum dots and methods of their synthesis in a coordinating solvent comprising an amine and a thiol.

BACKGROUND

Nanocrystal quantum dots of the I-III-VI $CuInSe_xS_{2-x}$ (CISeS) alloy system are of growing interest for applications in optoelectronic devices such as solar photovoltaics (PVs, Stolle, C. J.; Harvey, T. B.; Korgel, B. A. *Curr. Opin. Chem. Eng.* 2013, 2, 160) and light-emitting diodes (Tan, Z.; Zhang, Y.; Xie, C.; Su, H.; Liu, J.; Zhang, C.; Dellas, N.; Mohney, S. E.; Wang, Y.; Wang, J.; Xu, J. *Advanced Materials* 2011, 23, 3553). These quantum dots exhibit strong optical absorption and efficient photoluminescence that can be tuned from the visible to the near-infrared (near-IR, Zhong, H.; Bai, Z.; Zou, B. *J. Phys. Chem. Lett.* 2012, 3, 3167) through composition and quantum size effects. Long exciton lifetimes (Zhang, W.; Zhong, X. *Inorganic Chemistry* 2011, 50, 4065) that can facilitate charge separation, and facile solution processibility, render CISeS quantum dots promising for a range of different low-cost solar PV architectures, including sensitized titania solar cells of the type pioneered by Michael Grätzel and Brian O'Regan (O'Regan, B.; Gratzel, M. *Nature* 1991, 353, 737) that are commonly referred to as "Grätzel cells." In fact, Grätzel cells sensitized by specifically engineered CISeS quantum dots have recently been shown to offer excellent stability and certified power conversion efficiencies of >5%. (McDaniel, H.; Fuke, N.; Makarov, N. S.; Pietryga, J. M.; Klimov, V. I. *Nat. Commun.* 2013, 4, 2887.) Even higher efficiencies should be achievable by increasing the absorptivity of these cells in the near-IR spectral region by using quantum dots with narrower band gaps. Narrower band gaps are also attractive for medical imaging because biological tissues are more transparent in the near-IR. However, the quantum dots typically used contain toxic heavy metals such as cadmium or lead that are banned in some parts of the world. Furthermore, the synthesis of quantum dots usually requires toxic and air-sensitive phosphines (e.g., trioctylphosphine) to form the chalcogenide precursor which is added by injection at a high temperature.

SUMMARY

A scalable method for phosphine-free production of quantum dots, including alloyed quantum dots and/or heavy metal-free quantum dots, is highly desirable for commercialization. Potential applications for such low toxicity quantum dots include flexible electronics, solid-state lighting, solar energy, full color displays, bio-labeling, biological imaging, solar cells, light-emitting diodes, photosensors, nanostructured electronic arrays, luminescent pigments, thin-film displays, field-effect transistors (Draguta, S.; McDaniel, H. and Klimov, V. I. *Adv. Mater.*, 2015, 27, 1701, incorporated herein by reference) and other consumer products. Exemplary applications of luminescent pigments include biological tags, luminescent solar concentrators, phosphors for lighting, and design elements in architecture and consumer products.

Disclosed herein are embodiments of a method for making quantum dots that eliminates the need for using toxic and/or air sensitive phosphine compounds. In some embodiments, the method comprises preparing a solution comprising a first precursor, a second precursor, a thiol and an amine. The solution is heated to a first temperature suitable to initiate quantum dot nucleation, and then heated to a second temperature suitable to decompose the thiol. The solution may be maintained at the second temperature for a first amount of time effective to grow quantum dots of a selected size. The first temperature may be from 140° C. to 230° C., and the second temperature may be from 200° C. to 240° C. In some examples, the first amount of time is from greater than 0 to 60 minutes.

The first and second precursors may comprise copper, indium, gallium, silver, gold, aluminum, tin, zinc, cadmium, sulfur, tellurium, selenium or combinations thereof, and may be elemental metals or metalloids, salts, halides, oxides, or combinations thereof. In some embodiments, the solution comprises a first aliphatic thiol and a first aliphatic amine, which may each independently have from 1 to 25 carbon atoms. The first aliphatic thiol may have from 10 to 15 carbon atoms, may be 1-dodecanethiol, 1-undecanethiol, 1-decanethiol, 1-octanethiol, 1-hexadecanethiol or combinations thereof. The first aliphatic amine may be unsaturated or saturated and may have from 10 to 20 carbon atoms, such as oleylamine. The solution may also comprise at least a second aliphatic thiol and/or at least a second aliphatic amine. In some embodiments, the first precursor comprises a group 11 metal, group 12 metal, group 13 metal, or a combination thereof, the second precursor is selenium, sulfur or a combination thereof, and the quantum dots have a formula

$MSe_xS_{2-x}$ where M is a group 11 metal, group 12 metal, group 13 metal, or a combination thereof, and x is from greater than 0 to 2.

In some embodiments, preparing the solution comprises forming a first solution comprising the first precursor, a first thiol and a first amine, and forming a second solution comprising the second precursor, a second thiol and a second amine. The first solution is heated to a temperature of from 100° C. to 240° C., and the first and the second solutions are combined. The first and second solutions may be combined at a rate such that the temperature during the combining remains substantially the same as prior to the combining and within the range of 100° C. to 240° C., such as varying by from 0° C. to 10° C., preferably from 2° C. to 7° C. and even more preferably from 2° C. to 6° C., with certain embodiments varying by about 3° C. The first and second thiols may be the same and/or the first and second amines may be the same. In other embodiments, preparing the solution comprises combining the first and second precursors with the thiol and the amine and heating the combination to a temperature of from 80° C. to 140° C. to form the solution.

In some examples, the solution is heated to the first temperature at a heating rate sufficient to make quantum dots having a size with a selected size standard distribution, such as a standard size deviation in at least one dimension of from 0 to less than 25%, such as from 0 to less than 15%, from 0 to less than 10% or from 0 to less than 5%. For example, for certain disclosed embodiments the heating rate is from 2° C./minute to at least 10° C./minute, such as from 3° C./minute to 5° C./minute. The solution may be heated to the first temperature in an amount of time of from greater than 0 to 15 minutes. The quantum dots may have a height of less than 20 nm.

The method may also comprise forming a shell about a quantum dot to form a core/shell quantum dot, where the quantum dot forms the core of the core/shell quantum dot. In certain embodiments forming a shell comprises preparing a solution comprising a third precursor, mixing the quantum dots with the solution to form a mixture, and heating the mixture within a temperature of from 50° C. to 240° C. The third precursor may comprise copper, indium, zinc, aluminum, tin, tellurium, sulfur, selenium, cadmium, gallium, silver, gold, or combinations thereof. The mixture may be heated for a second amount of time suitable to form a shell of a selected thickness, such as from greater than 0 to 60 minutes. In some examples, the selected shell thickness is greater than a radius of a quantum dot core. In some instances the quantum dot core has a diameter of from greater than zero to at least 20 nm, such as from 1 nm to 20 nm, and preferably from 1 nm to 15 nm. The shell thickness may vary from 1 monolayer to at least 20 monolayers, about 7 nm. In certain embodiments, the shell comprises an alloy of sulfur or an alloy of sulfur and selenium.

In some embodiments, the method comprises dissolving selenium and a cation precursor in a mixture of an aliphatic thiol and an aliphatic amine to form a first solution, the aliphatic thiol and aliphatic amine each independently having from 1 to 25 carbon atoms; heating the first solution to a first temperature of from 100° C. to 240° C. in 15 minutes or less; maintaining the first solution with a second temperature of from 210° C. to 240° C. for a period of time of from 1 minute to 60 minutes to form quantum dot cores of a selected size; dissolving a shell precursor in a second mixture of an aliphatic thiol and an aliphatic amine to form a second solution; combining the second solution and the quantum dot cores to form a mixture; and heating the mixture to a third temperature of from 50° C. to 240° C. The cation precursor may be copper iodide, zinc acetate, indium acetate, gallium acetate, silver iodide, 1-dodecanethiol or a combination thereof. The shell precursor may be zinc acetate, cadmium oxide, selenium metal, 1-dodecanethiol or a combination thereof. Quantum dots, including core/shell quantum dots, made by the disclosed method may be used in any of a variety of devices including, for example, a photovoltaic device, solar energy device, lighting device, full-color display device, bio-labeling device, biological imaging device, or device comprising flexible electronics.

Embodiments of a quantum dot composition made by the disclosed method are disclosed herein. The composition may have an absorbance onset of from 500 nm to 1200 nm and/or a photoluminescence of from 530 to 1400 nm.

Also disclosed herein are embodiments of a composition comprising quantum dots having a standard size distribution deviation of from 0 to less than 25%, and a core composition according to a formula

$MSe_xS_{2-x}$ wherein M is a group 11 metal, group 12 metal, group 13 metal, or a combination thereof, and x is from 0 to 2. In some examples, x is from greater than 1.5 to 2.

The foregoing and other objects, features, and advantages of the invention will become more apparent from the following detailed description, which proceeds with reference to the accompanying figures.

DETAILED DESCRIPTION

I. Definitions and Abbreviations

Figure 1:
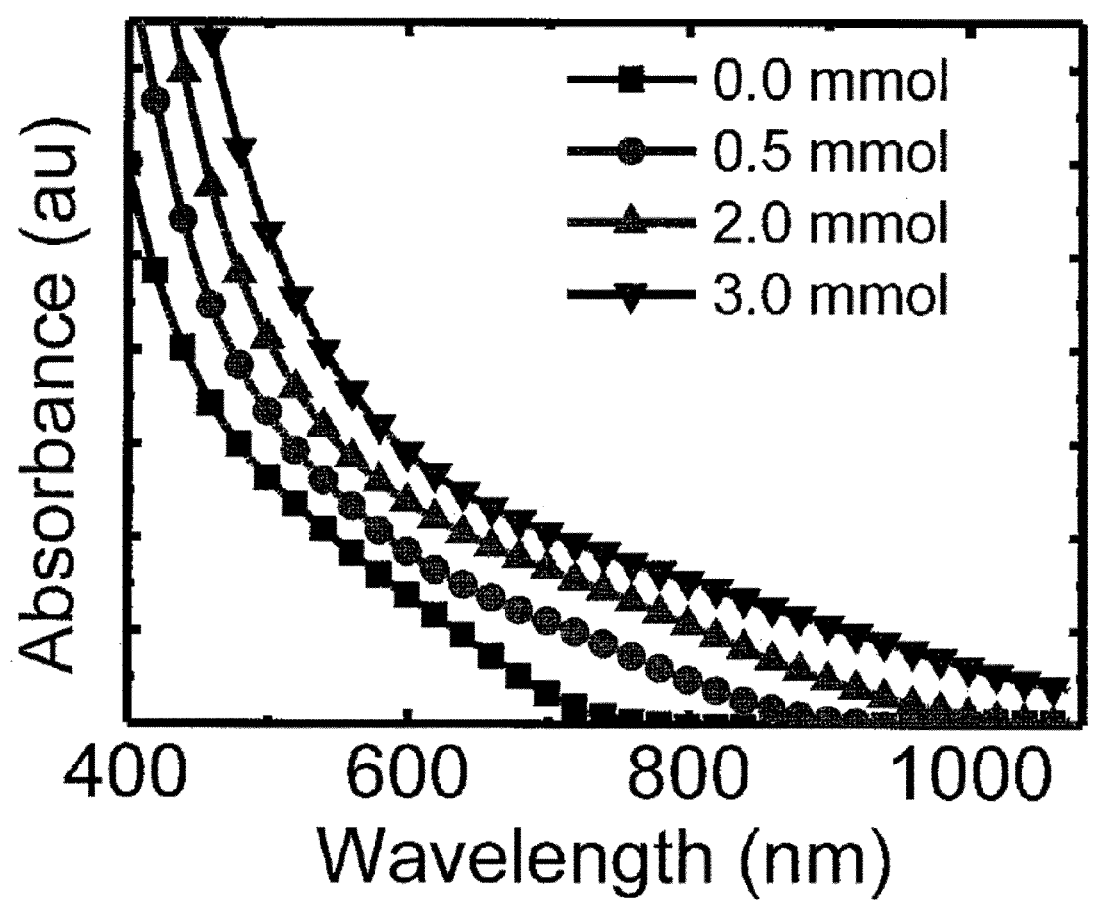
FIG. 1 is a graph of absorbance versus wavelength for $CuInSe_xS_{2-x}$ quantum dots synthesized in oleylamine and 1-dodecanethiol with varying amounts of selenium.

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about." Unless otherwise indicated, non-numerical properties such as colloidal, continuous, crystalline, and so forth as used in the specification or claims are to be understood as being modified by the term "substantially," meaning to a great extent or degree. Accordingly, unless otherwise indicated, implicitly or explicitly, the numerical parameters and/or non-numerical properties set forth are approximations that may depend on the desired properties sought, limits of detection under standard test conditions/methods, limitations of the processing method, and/or the nature of the parameter or property. When directly and explicitly distinguishing embodiments from discussed prior art, the embodiment numbers are not approximates unless the word "about" is recited.

Aliphatic: A substantially hydrocarbon-based organic compound, group or moiety including straight chain and branched arrangements of alkanes, alkenes and alkynes, and cyclic versions thereof, such as cycloalkanes, cycloalkenes and cycloalkynes. Unless expressly stated otherwise, an aliphatic group may have from 1 to 25 carbon atoms, for example, from 1 to 20 carbon atoms, from 1 to 15 carbon atoms, from 5 to 20 carbon atoms, from 10 to 20 carbon atoms, or from 5 to 15 carbon atoms.

Amine: An organic compound having an amino functional group containing a nitrogen atom, including primary amines with the formula $R-NH_2$, secondary amines with the formula $R^1,R^2-NH$, and tertiary amines with the formula $R^1,R^2,R^3-N$.

Core: A semiconductor nanocrystal typically comprising one material. In some cases, stoichiometry can vary significantly at the surface of a core from the center of the core. In other cases, the composition varies even in regions away from the surface.

Shell: A layer of material, typically semiconductor material, around a core comprising a different material. The shell material may be heterogeneous in composition or may be homogeneous.

Thiol: An organic compound having a sulfhydryl (—SH) functional group.

Quantum dot: A nanoscale particle that exhibits size-dependent electronic and optical properties due to quantum confinement. The quantum dots disclosed herein generally have at least one dimension less than about 100 nanometers. The disclosed quantum dots may be colloidal quantum dots, i.e., quantum dots that may remain in suspension when dispersed in a liquid medium. Some quantum dots are made from a binary semiconductor material having a formula MX, where M is a metal and X typically is selected from sulfur, selenium, tellurium, nitrogen, phosphorus, arsenic, antimony or mixtures thereof. Exemplary binary quantum dots include CdS, CdSe, CdTe, PbS, PbSe, PbTe, ZnS, ZnSe, and ZnTe. Other quantum dots are tertiary or ternary alloy quantum dots including, but not limited to, ZnSSe, ZnSeTe, ZnSTe, CdSSe, CdSeTe, ScSTe, HgSSe, HgSeTe, HgSTe, ZnCdS, ZnCdSe, ZnCdTe, ZnHgS, ZnHgSe, ZnHgTe, CdHgS, CdHgSe, CdHgTe, ZnCdSSe, ZnHgSSe, ZnCdSeTe, ZnHgSeTe, CdHgSSe, CdHgSeTe, $CuInS_2$, $CuInGaSe_2$, $CuInAlS_2$, $CuZnSnSe_2$, $CuIn(Se,S)_2$, $CuZn(Se,S)_2$, and $CuSn(Se,S)_2$ quantum dots. Embodiments of the disclosed quantum dots may be of a single material, or may comprise an inner core and an outer shell, e.g., a thin outer shell/layer formed by any suitable method, such as cation exchange. The quantum dots may further include a plurality of ligands bound to the quantum dot surface.

II. Synthesis of Quantum Dots and Quantum Dot Cores

Pure $CuInS_2$ (i.e., $CuInSe_xS_{2-x}$ with x=0) quantum dots can be synthesized using an inexpensive and highly scalable method in which copper(I) iodide and indium(III) acetate are reacted with 1-dodecanethiol. 1-dodecanethiol functions as solvent, ligand, and sulfur precursor. Li, L. A.; Pandey, A.; Werder, D. J.; Khanal, B. P.; Pietryga, J. M.; Klimov, V. I. *J. Am. Chem. Soc.* 2011, 133, 1176, which is incorporated herein by reference. However, the precursors did not dissolve completely in the 1-dodecanethiol, resulting in a non-homogeneous mixture. Quantum dots grown in this mixture had a large size distribution, typically 20% or greater. Additionally, due, in part, to the non-homogeneous mixture, the reproducibility of the results was poor. In the present disclosure, adding oleylamine to the mixture enables homogeneous dissolution of the precursors, resulting in better size control, and better reproducibility.

Quantum dots synthesized by the above method generally offer higher-than-ideal band gaps for PV applications, but because the bulk band gap ($E_g$) of $CuInSe_2$ (1.0 eV) is substantially smaller than that of $CuInS_2$ (1.5 eV), the band gap of CISeS quantum dots can be narrowed by increasing the relative fraction of selenium. Indeed, by adding controlled amounts of tri-n-octylphosphine selenide (TOP-Se, McDaniel, H.; Fuke, N.; Pietryga, J. M.; Klimov, V. I. *J. Phys. Chem. Lett.* 2013, 4, 355, which is incorporated herein by reference) or tri-nbutylphosphine selenide (Panthani, M. G.; Khan, T. A.; Reid, D. K.; Hellebusch, D. J.; Rasch, M. R.; Maynard, J. A.; Korgel, B. A. *Nano Letters* 2013, 13, 4294, which is incorporated herein by reference), absorption onset can be lowered to about 1.5 eV. In these pyramidally shaped quantum dots, selenium content can be tuned up to about 75% of the total amount of anions (x=1.5), for average sizes of from 2 nm to 6 nm. The size of the quantum dot is defined as the height of the pyramid base measured by transmission electron microscopy (TEM), or the diameter for spherical-shaped quantum dots. Further red-shifting can, in principle, be achieved by increasing particle size. However, larger quantum dots become increasingly difficult to effectively load into the mesoporous-$TiO_2$ (mp-$TiO_2$) electrode of a Grätzel cell. A better, yet unrealized, approach to extending absorption to lower photon energies is to maintain a small quantum dot size (<4 nm), while increasing the amount of selenium beyond x=1.5. Previous attempts to synthesize pure $CuInSe_2$ quantum dots produced particles that were too large for incorporation into a mp-$TiO_2$ scaffold. (Panthani, M. G.; Akhavan, V.; 25 Goodfellow, B.; Schmidtke, J. P.; Dunn, L.; Dodabalapur, A.; Barbara, P. F.; Korgel, B. A. *J. Am. Chem. Soc.* 2008, 130, 16770; Koo, B.; Patel, R. N.; Korgel, B. A. *J. Am. Chem. Soc.* 2009, 131, 3134; Kar, M.; Agrawal, R.; Hillhouse, H. W. *J. Am. Chem. Soc.* 2011, 133, 17239; Stolle, C. J.; Panthani, M. G.; Harvey, T. B.; Akhavan, V. A.; Korgel, B. A. *Acs. Appl. Mater. Inter.* 2012, 4, 2757, which are all incorporated herein by reference.) Further, unlike pure $CuInS_2$ or alloyed CISeS quantum dots, the reported $CuInSe_2$ quantum dots did not exhibit photoluminescence, implying that they are prone to defects that serve as nonradiative recombination centers. Nonradiative quenching of excitons is detrimental to PV applications as it competes with charge separation. (Makarov, N. S.; McDaniel, H.; Fuke, N.; Robel, I.; Klimov, V. I. *J. Phys. Chem. Lett.* 2013, 5, 111; Wanger, D. D.; Correa, R. E.; Dauler, E. A.; Bawendi, M. G. *Nano Letters* 2013, 13, 5907, which are both incorporated herein by reference.)

Described herein are embodiments of a synthetic method for making size-tunable quantum dots, including CISeS quantum dots, with widely controllable selenium content ($0 \leq x \leq 2$). In some embodiments, the quantum dots have an absorption onset at energies as low as 1.2 eV without losing efficient photoluminescence. In some embodiments of the disclosed method, a phosphine-free, mixed-solvent selenium source is used that was previously used in the synthesis of $Cu_2ZnSnSe_4$ nanocrystals. (Liu, Y.; Yao, D.; Shen, L.; Zhang, H.; Zhang, X.; Yang, B. *J. Am. Chem. Soc.* 2012, 134, 7207, which is incorporated herein by reference.) However, the authors maintained the reaction at a temperature below the decomposition temperature of the thiol. The authors report that the ratio of metals in the product nanocrystal was not consistent with the amounts of the precursors used. Embodiments of the disclosed method have chemical yields of at least 90%. Additionally, no size distribution is reported for the synthesized nanocrystals. The document only reports one size per composition. And the authors do not report any photoluminescence associated with the synthesized nanocrystals, whereas compounds made according to the present disclosure exhibit high quantum yields, as expected from quantum dots with a high selenium content. Finally, the reference only disclose an injection-based synthesis, which is typically not easily scaled up to a commercial scale. The present disclosure discloses both an injection and a non-injection method, the latter being easily scaled-up to produce amounts of quantum dots suitable for commercial use.

In some embodiments, the mixed-solvent system is a mixture of a thiol and an amine. The thiol may be any thiol suitable for use as a reducing agent, ligand, sulfur source and/or solvent for the reaction. In some embodiments, the thiol is an aliphatic thiol, and may have from 1 to 25 carbon atoms, more typically from 10 to 15 carbon atoms. The thiol may be a mixture of 2 or more thiols. Exemplary thiols include, but are not limited to, 1-dodecanethiol, 1-undecanethiol, 1-decanethiol, 1-octanethiol, 1-hexadecanethiol or combinations thereof.

The amine may be any suitable amine that can form a complex with the metals. In some embodiments, the amine is an aliphatic amine, and may have from 1 to 25 carbon atoms, more typically 15 to 20 carbon atoms. In certain embodiments, the amine is an unsaturated amine. Exemplary amines include, but are not limited to, oleylamine, octylamine, dodecylamine, hexadecylamine, butylamine, methylamine or combinations thereof.

In some examples, the amine and/or thiol is a liquid at ambient temperature, and/or have a sufficiently high boiling point that they can be heated to the maximum temperature of the reaction within a temperature range of 140° C. to 250° C. The ratio of thiol to amine may be selected to dissolve the precursors, to provide sufficient sulfur to the quantum dots, to facilitate heating to the highest temperature required for the particular application, to be a liquid at room temperature, or any combination thereof. In some examples, the volume to volume (v/v) ratio of thiol to amine is from 10:90 to 90:10, such as 10:90, 20:80, 25:75, 30:70, 40:60, 50:50, 60:40, 70:30, 75:25, 80:20, or 90:10.

Figure 3:
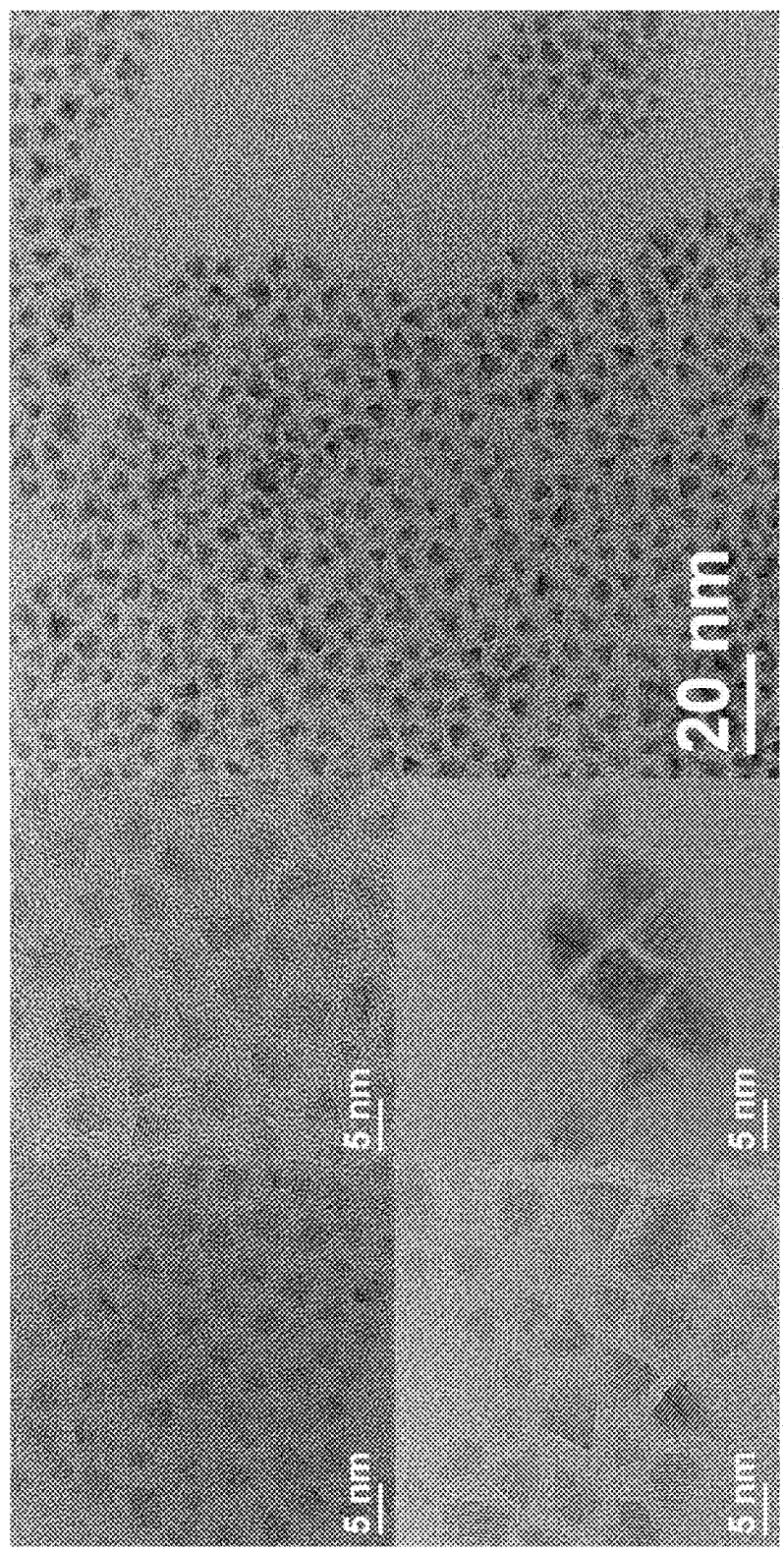
FIG. 3 provides multiple transmission electron microscopy (TEM) images of $CuInSe_xS_{2-x}$ quantum dots synthesized in oleylamine and 1-dodecanethiol with various growth times demonstrating the ability to control size.
Figure 4:
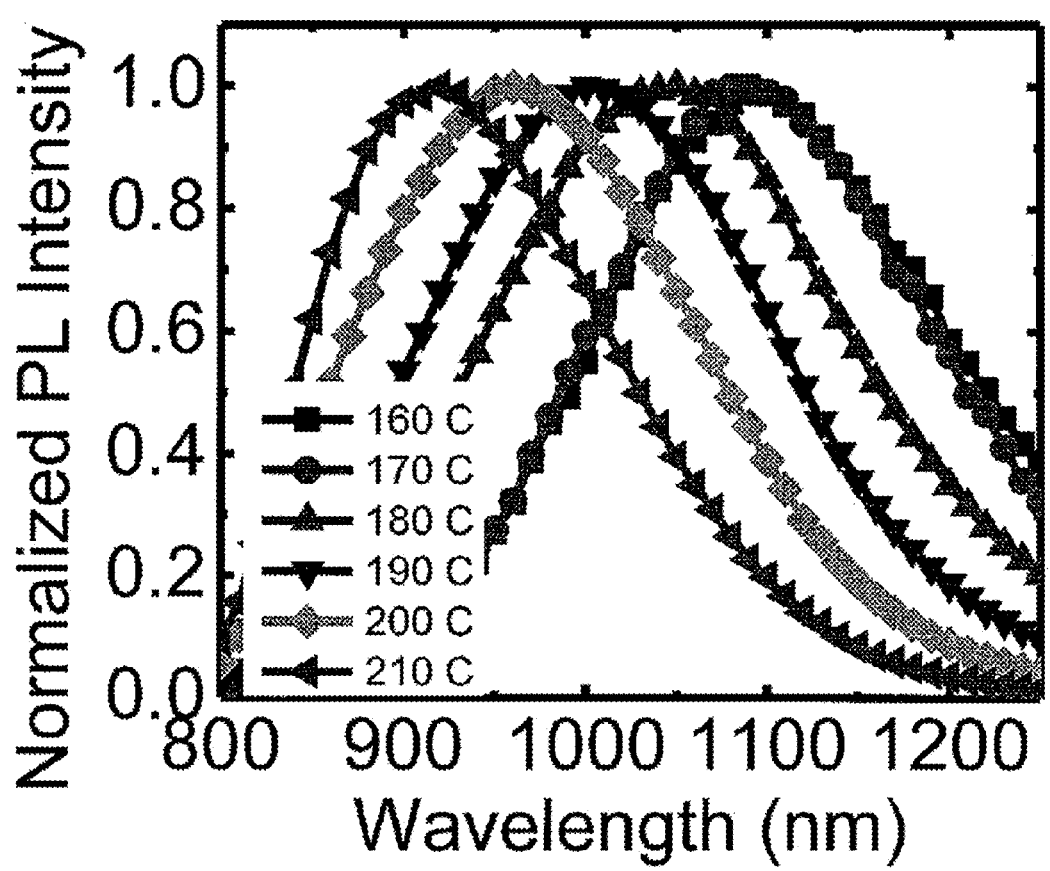
FIG. 4 is a graph of photoluminescence intensity versus wavelength for $CuInSe_xS_{2-x}$ quantum dots synthesized in oleylamine and 1-dodecanethiol by injecting a fixed amount of selenium dissolved in oleylamine and 1-dodecanethiol at varying temperatures.

In certain embodiments, a 1 M precursor solution was formed by dissolving elemental selenium powder in a solution of 25% (v/v) 1-dodecanethiol and 75% oleylamine (OLA) at room temperature. The use of elemental selenium instead of TOP-Se (McDaniel, H.; Fuke, N.; Pietryga, J. M.; Klimov, V. I. *J. Phys. Chem. Lett.* 2013, 4, 355, which is incorporated herein by reference) allowed the absorption onset (FIG. 1) and photoluminescence (FIG. 2) to be tuned over a wider range of spectral energies than can be achieved by using TOP-Se, by varying the amount of the injected precursor, and thereby the quantum dot composition, while substantially preserving the same size (e.g., see FIG. 3). Further fine-tuning of the Se content was achieved by controlling the reaction temperature during injection (FIG. 4). In some examples, the absorption onset is from 500 nm to at least 1200 nm, such as from 700 nm to 1200 nm, from 800 nm to 1200 nm or from 900 nm to 1200 nm. The photoluminescence may be from 500 nm to at least 1400 nm, such as from 540 nm to 1400 nm, from 700 nm to 1400 nm, from 900 nm to 1400 nm or from 1100 nm to 1400 nm. The typical photoluminescence quantum yield of these quantum dot cores was about 5%, which can be increased to from 30% to 100%, from 50% to 100%, from 60% to 100%, from 70% to 100%, or from 80% to 100%, after the formation of a shell.

Figure 2:
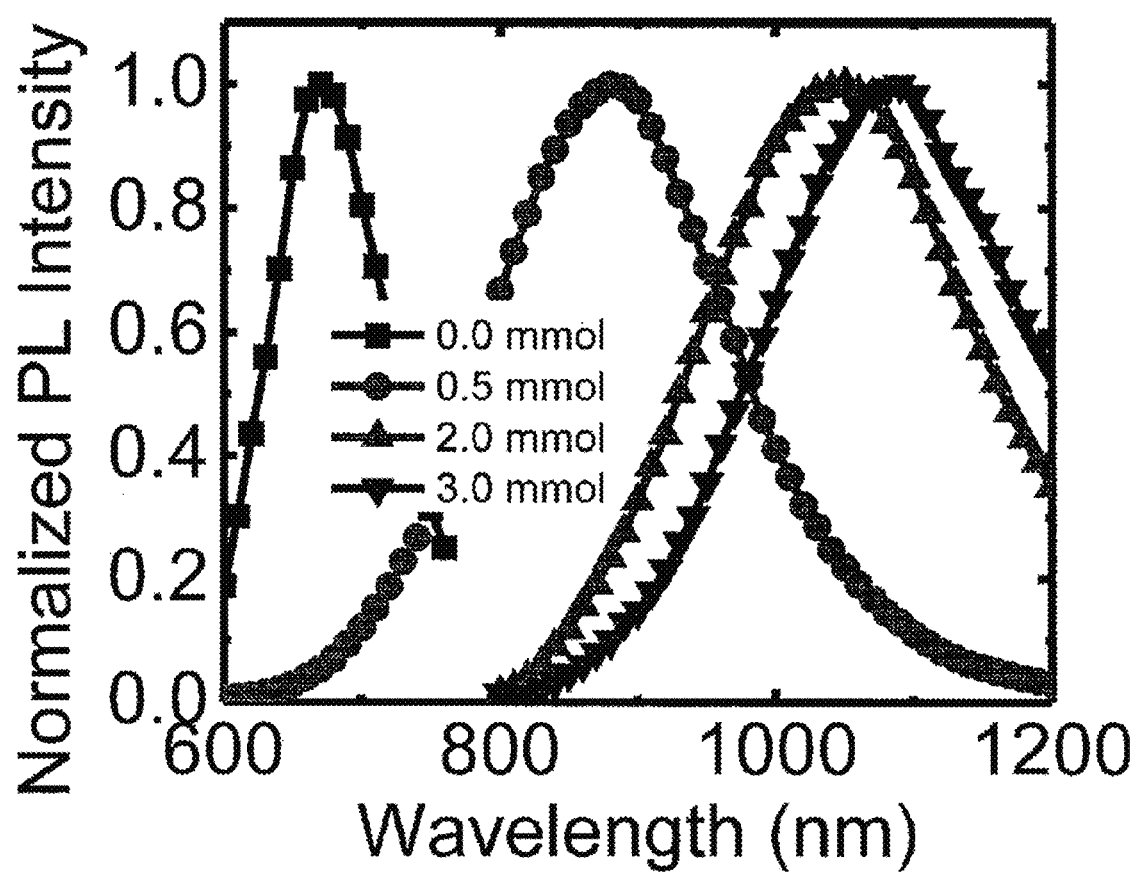
FIG. 2 is a graph of photoluminescence intensity versus wavelength for $CuInSe_xS_{2-x}$ quantum dots synthesized in oleylamine and 1-dodecanethiol with varying amounts of selenium.
Figure 5:
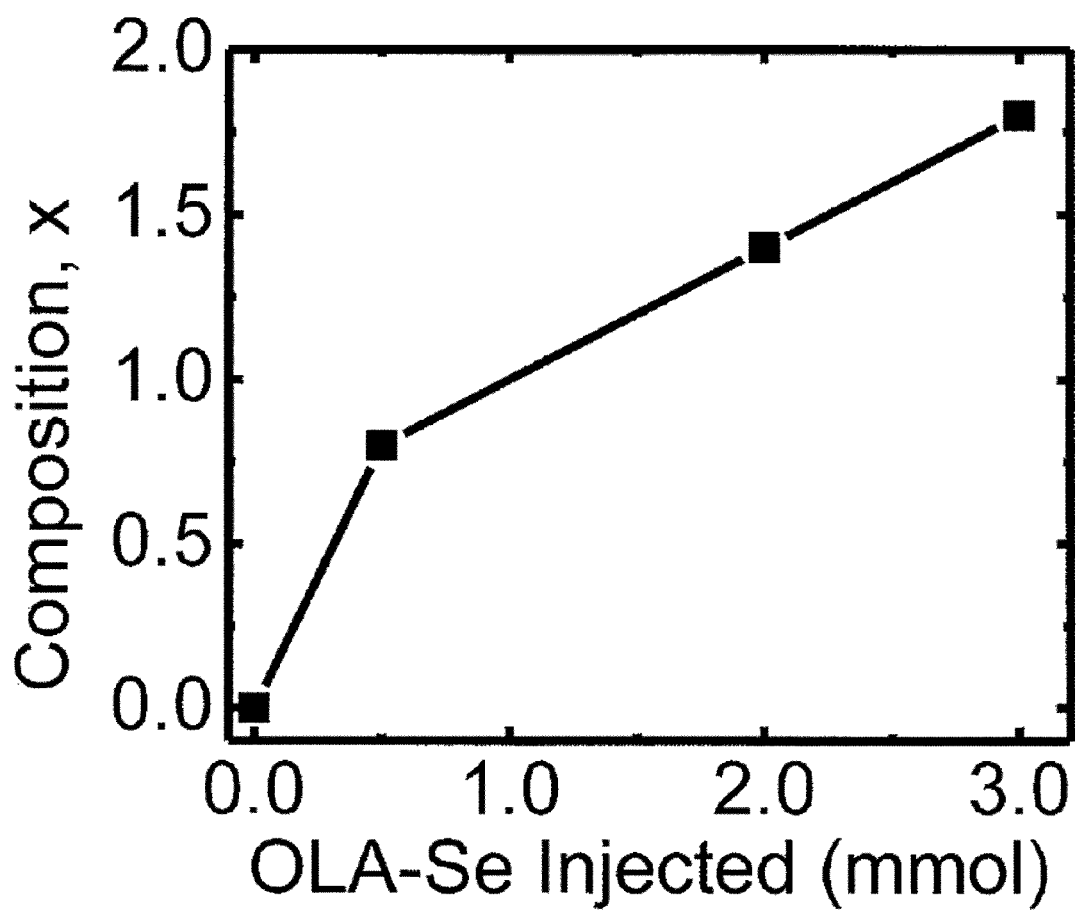
FIG. 5 is a graph of composition of $CuInSe_xS_{2-x}$ quantum dots synthesized in oleylamine and 1-dodecanethiol with varying amounts of selenium measured by inductively coupled plasma optical emission spectroscopy.
Figure 6:
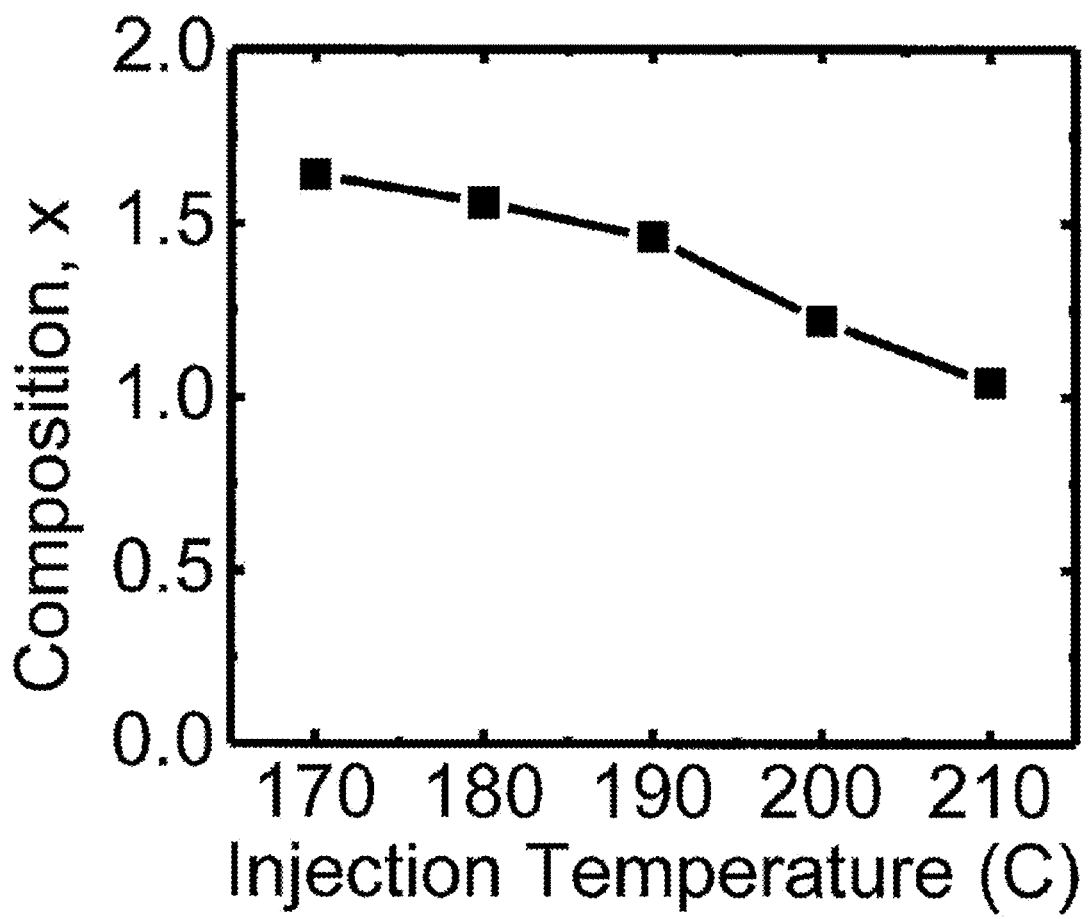
FIG. 6 is a graph of composition of $CuInSe_xS_{2-x}$ quantum dots synthesized in oleylamine and 1-dodecanethiol by injecting a fixed amount of selenium dissolved in oleylamine and 1-dodecanethiol at varying temperatures measured by inductively coupled plasma optical emission spectroscopy.
Figure 7:
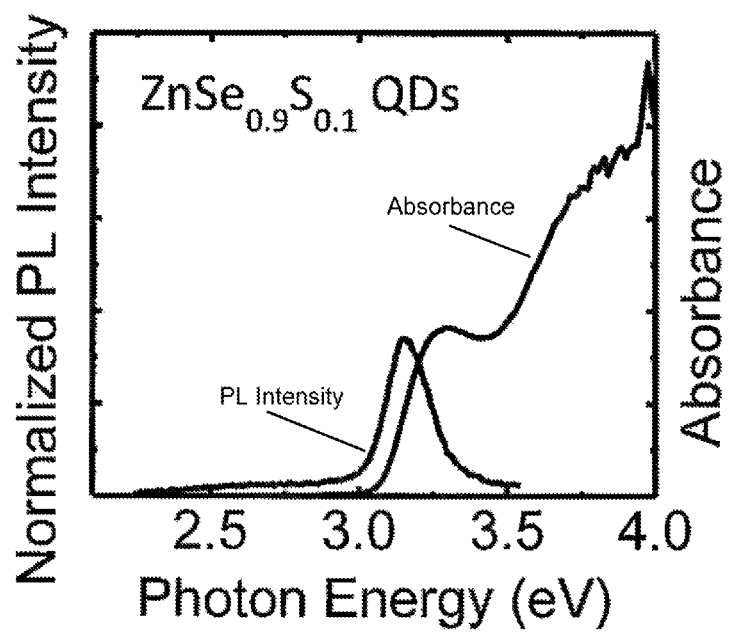
FIG. 7 is a graph of absorption and photoluminescence spectra versus photon energy for $ZnSe_yS_{1-y}$ quantum dots synthesized in oleylamine and 1-dodecanethiol
Figure 8:
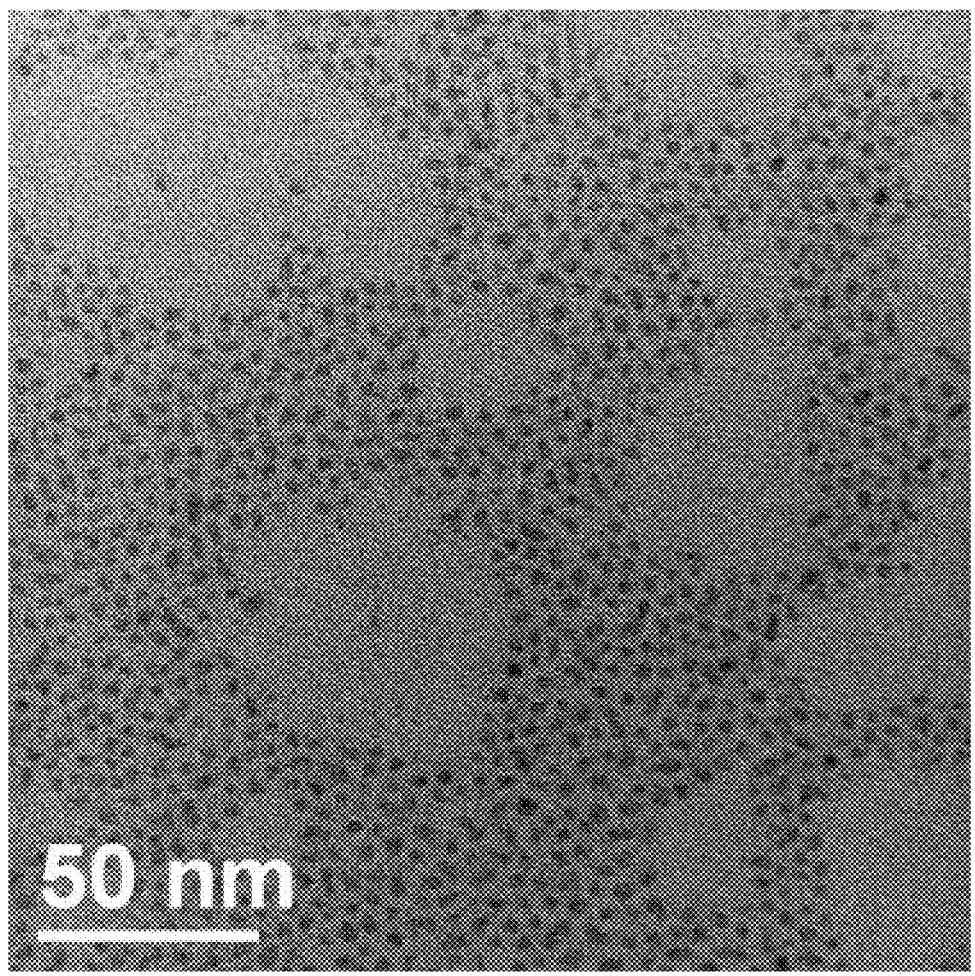
FIG. 8 is a transmission electron microscopy image of $ZnSe_yS_{1-y}$ quantum dots synthesized in oleylamine and 1-dodecanethiol.

Variations in optical properties correlated well with elemental composition, as determined via inductively coupled plasma optical emission spectroscopy (ICP-OES, FIG. 5). FIGS. 1 and 2 show that changes in the amount of the injected precursor allow the selenium content to be broadly tuned over nearly the entire possible range of compositions, while changes in temperature produce much finer effects (FIGS. 4 and 6). In some embodiments, maintaining a substantially stable reaction temperature throughout the entire precursor injection results in a very controlled composition. Regardless of amount, it may be advantageous in some examples for the injection to be performed slowly enough to not significantly perturb the reaction temperature. In some embodiments, the temperature varies during the addition by from 0° C. to 10° C., such as from 0° C. to 7° C., from 0° C. to 5° C., from 0° C. to 3° C. or from 0° C. to less than 3° C. In order to demonstrate the generality of this method, $ZnSe_yS_{1-y}$ quantum dots were synthesized by replacing the copper and indium precursors with zinc (II) acetate (FIGS. 7 and 8).

Significantly, if the selenium precursor is injected below 170° C., there is no further dependence of the composition or optical properties on temperature (FIG. 4). Therefore, synthesis of selenium-containing quantum dots, such as $CuInSe_xS_{2-x}$ or $ZnSe_yS_{1-y}$ quantum dots, can be conducted via a non-injection approach whereby the selenium is added at the beginning with the other precursors. The non-injection approach can be scaled up without substantially affecting the quality or composition of the quantum dots produced. In some embodiments of the non-injection method, both a thiol and an amine are included in the reaction mixture for dissolution of selenium or other precursors. The dissolution of the precursors may be more effective when the reaction solvent includes both a thiol and an amine. In some embodiments, it may be preferable to use the same amine and thiol for both the reaction solvent and the selenium precursor, thereby simplifying the supply chain and lowering the costs of raw materials and/or waste disposal.

With both the injection and non-injection approaches, the selenium-containing mixture is heated to facilitate quantum dot nucleation. The temperature at which nucleation initiates may depend on the nature of the starting materials. In some embodiments, the nucleation temperature depends on the decomposition temperature of the thiol used in the reaction. The decomposition of the thiol may provide at least a portion of the sulfur required for the quantum dots, and in some embodiments, the thiol is the only sulfur source in the reaction and therefore provides substantially all of the sulfur used in the quantum dot synthesis. In some examples, the presence of selenium lowers the decomposition temperature. The amount by which the decomposition temperature is lowered may depend on the amount of selenium present relative to the amount of thiol, with increasing amounts of selenium resulting in decreasing thiol decomposition temperatures. In some embodiments, the nucleation and/or thiol decomposition temperature is from 100° C. to at least 300° C., such as from 120° C. to 250° C., 140° C. to 240° C. or from 160° C. to 230° C.

Relatively high emission quantum yields are maintained at very high selenium content, even as photoluminescence peaks approach the bulk band gap of CuInSe$_2$ (E$_g$=1 eV). In previous efforts employing phosphine-based precursors, the photoluminescence quantum yield generally decreased with increasing selenium content, but selenium rich quantum dots were particularly sensitive to air exposure (evidenced by an even more dramatic drop in quantum yield). Neither is the case with quantum dots synthesized according to disclosed embodiments, which suggests that these quantum dots have a different surface structure. Without being bound to a particular theory, synthesis based on the decomposition of thiols can result in "crystal bound" ligands that sit at high coordination sites and are the terminal surface layer of the nanocrystal. (Turo, M. J. and Macdonald, J. E. *ACS Nano*, 2014, 8, 10205, which is incorporated herein by reference). Surfaces terminated in this way may be less prone to oxidation or have fewer dangling bonds that give rise to nonradiative recombination pathways and thus have higher and more stable photoluminescence quantum yield.

In some embodiments the amounts of copper and indium in the quantum dots are approximately equal. In other embodiments, the quantum dots are copper or indium deficient. Quantum dots that are copper deficient may have a higher quantum yield and/or photoluminescence. In some embodiments, using an excess of an indium precursor compared to a copper precursor results in an excess amount of indium to copper in the quantum dot. The ratio of copper to indium in the quantum dot may or may not be the same as the ratio of copper precursor to indium precursor. In certain embodiments, a Cu:In ratio of 1:4 with respect to the precursors results in a Cu:In ratio of 0.75:1 in the quantum dots.

Although composition control alone allows tuning of the band gap over a wide range of energies even for relatively small quantum dot sizes, for some applications size-based tuning is an acceptable or even desired approach (e.g., the rate of Auger recombination is not sensitive to composition but strongly depend on quantum dot dimensions, Robel, I.; Gresback, R.; Kortshagen, U.; Schaller, R. D.; Klimov, V. I. *Phys. Rev. Lett.* 2009, 102, incorporated herein by reference). Disclosed embodiments of the present method enable one to select a specified quantum dot size, due to the slow growth rate of quantum dots in this method. For certain disclosed embodiments, growth times vary from greater than 0 to at least 60 minutes, such as from 1 minute to 60 minutes, 5 minutes to 50 minutes or 10 minutes to 30 minutes (FIG. 3). In some embodiments, the size of at least one dimension of the quantum dot, such as the height, is from greater than 0 to at least 20 nm, such as from 1 nm to 20 nm, from 2 nm to 10 nm, from 2 nm to 8 nm, from 2 nm to 6 nm or from 2 nm to 4 nm. In some embodiments, a pyramidal shape is observed at all sizes. In other embodiments, the quantum dots have a spherical shape at all sizes.

In some embodiments of the disclosed method, synthesized quantum dots and/or quantum dot cores comprise a group semiconductor, a group I-II-IV-VI semiconductor, a group II-VI semiconductor, a group III-VI semiconductor, or a combination thereof.

In some embodiments, a quantum dot or a quantum dot core has a formula I

$$MSe_xS_{2-x} \qquad \qquad \qquad \text{I.}$$

With reference to formula I, M is a group 11 metal, group 12 metal, group 13 metal, group 14 metal, or combination thereof, and x is from 0 to 2, such as from greater than 0 to 2, from 0 to less than 2, or from greater than 0 to less than 2. x may be from 1.5 to 2, such as from greater than 1.5 to 2, from 1.5 to less than 2, or from greater than 1.5 to less than 2. In some examples, M comprises a group 11 metal and a group 13 metal.

In other embodiments, a quantum dot or a quantum dot core has a formula II

$$MSe_yS_{1-y} \qquad \qquad \qquad \text{II.}$$

With reference to formula II, M is group 11 metal, group 12 metal, group 13 metal, group 14 metal, or combination thereof, and y is from 0 to 1, such as from greater than 0 to 1, from 0 to less than 1, or from greater than 0 to less than 1. In certain examples, M is a group 12 metal.

With reference to both formulas I and II, M may be copper, silver, gold, zinc, cadmium, aluminum, mercury, gallium, indium, germanium, tin, lead or a combination thereof. In some examples, M does not comprise a heavy metal, and/or is selected from copper, silver, gold, zinc, aluminum, gallium, indium, germanium, tin or a combination thereof. In other embodiments, M is copper, silver, gold, zinc, cadmium, gallium, indium or combinations thereof. Exemplary quantum dots include, but are not limited to, CuInGaSe$_x$S$_{2-x}$, AgInS$_2$, Ag$_{0.9}$In$_{1.0}$Se$_{1.0}$S$_{1.0}$ and Ag$_{0.9}$In$_{1.0}$Se$_{1.1}$S$_{0.9}$.

III. Shell Growth

A shell can be grown using the same methods described above for the synthesis of quantum dots or quantum dot cores. Prior to heating the solution, quantum dot cores are added, which act as seeds for the growth of the second material. The thickness of the shell may be selectively varied by varying the amount of time the quantum dot cores are heated in the presence of the second material. In some embodiments, the heating period is from about 1 minute to greater than 60 minutes, such as from 1 minute to 60 minutes, 5 minutes to 50 minutes or from 10 minutes to 30 minutes. The process may be repeated once or multiple times, such as twice, three times, four times, five times, or more than five times, to further increase the thickness of the shell, or to add an additional shell or shells, where two or more shells have a different composition.

In other embodiments, a shell can be produced by cation exchange. In these embodiments, a solution of the metal cation to be introduced is prepared in a suitable solvent. In some embodiments, the metal cation is prepared by mixing the metal with an acid to form a metal salt. The metal may be elemental metal, or it may be a metal salt. In some embodiments, the metal is a metal oxide, acetate or halide. Suitable acids include any acid that will dissolve the metal and form the metal salt. In other embodiments, the metal cation is prepared by mixing a metal salt with an amine to form an ammine complex. In certain embodiments, oleic acid was used, which formed a metal oleate salt.

Solvents suitable for shell-forming solutions include any solvent that will form a solution with the metal salt. The solvent may be an aliphatic solvent, and may have from 1 to 25 carbon atoms, more typically 15 to 20 carbon atoms. In some embodiments, the solvent comprises one or more polar functional groups, such as an amine, hydroxyl, carboxylate, carboxyl, nitrile, ether or thiol. In other embodiments, the solvent is not an amine or thiol. In certain examples, the solvent is a non-polar solvent, and may be an alkane or alkene. In some embodiments, the solvent is selected to be compatible with the acid used to form the metal salt. In other embodiments, the solvent is a mixture of two or more solvents, such as three, four, five or more solvents. Suitable solvents include, but are not limited to, octadecene, octylamine, dodecylamine, hexadecylamine, butylamine, methylamine or combinations thereof.

The quantum dot cores are combined with the metal cation solution, and the mixture is heated to a temperature suitable to facilitate cation exchange. The temperature may be selected to facilitate a desired degree of cation exchange. In some embodiments, the suitable temperature is from 30° C. to 200° C., such as from 50° C. to 150° C. Cation exchange proceeds for a time suitable to facilitate a desired degree of exchange. In some embodiments, cation exchange proceeds for from 1 minute to 60 minutes, such as from 5 minutes to 50 minutes or from 10 minutes to 30 minutes, and in certain embodiments, the cation exchange was performed for 10 minutes. In some embodiments, the quantum dot cores comprise copper, indium, selenium, and sulfur atoms.

In some embodiments, quantum dots can be formed where the majority of the total quantum dot material is shell material, as determined by standard techniques such as atomic composition or by volume. In some embodiments, the shell material accounts for greater than 50% of the total material by atomic % of the quantum dot to at least 95%, such as >60%, >70%, >80%, >90% or >95% of the total material of the quantum dot.

In some embodiments, the shell has a composition according to formula I. In other embodiments, the shell has a composition according to formula II. In some shell embodiments, M may be copper, silver, gold, zinc, aluminum, cadmium, mercury, gallium, indium, germanium, tin, lead or a combination thereof. In other examples, M does not comprise a heavy metal, such as cadmium, lead or mercury, and/or is selected from copper, silver, gold, zinc, gallium, indium, germanium, tin or a combination thereof.

Exemplary shell compositions include, but are not limited to, $CuInS_2$, $CuGaS_2$, $CuAlS_2$, $CuIn_{0.5}Ga_{0.5}S_2$, $CuZn_{0.5}Sn_{0.5}S_2$, $CuInSe_xS_{2-x}$, $CuZn_{0.5}Sn_{0.5}Se_xS_{2-x}$, ZnS, ZnSe, $ZnSe_yS_{1-y}$, CdS, CdSe, $CdSe_yS_{1-y}$, or a combination thereof, wherein $0 \leq x \leq 2$, and $0 \leq y \leq 1$.

IV. Examples

Example 1

Synthesis of $CuInSe_xS_{2-x}$ Quantum Dots:

Typically, 1 mmol of copper iodide and 1 mmol of indium acetate were dissolved in 5 mL of 1-dodecanethiol (DDT) and 1 mL of oleylamine (OLA) in a 50 mL round bottom flask, and the mixture was degassed under vacuum at 90° C. for 30 minutes. The temperature was then raised to 140° C. until all solid precursors were fully dissolved, typically in from greater than 0 to 15 minutes. Separately, a solution of 1 M OLA/DDT-Se was made by mixing 79 mg selenium powder per 0.75 mL OLA and 0.25 mL DDT at room temperature under argon. The flask was then heated to 170-210° C. under Argon, whereupon 0-3 mL of the 1 M OLA/DDT-Se solution was added dropwise such that the temperature of the reaction mixture did not vary by more than about 3° C. In alternative embodiments, selenium powder was added to the reaction flask at the beginning (with copper iodide and indium acetate).

The temperature was maintained for ten additional minutes to allow for quantum dot nucleation (this step was sometimes skipped for injections of ≤0.5 mL of OLA/DDT-Se), then the temperature was set to 230° C. for 1-60 minutes, depending on the size desired (for instance, about 10 minutes for 3.5 nm quantum dots). The heating element was then removed and the quantum dots were allowed to cool. The resulting CISeS quantum dots were purified by iterative dissolution in chloroform and precipitation with methanol, and then stored in chloroform, octane, or 1-octadecene under inert atmosphere. Yield was approximately 0.5 grams.

The reaction is scalable, and typically resulted in more than 90% chemical yield of quantum dots (relative to Cu and In precursors). For example, when the amounts of reactants, reagents and solvents were directly scaled up by 20 times, the yield was approximately 10 grams. The rate of heating was maintained such that the temperature was raised to about 140° C. in less than 15 minutes, and other temperatures and times remained the same.

Example 2

Synthesis of $ZnSe_yS_{1-y}$ Quantum Dots:

Typically, 2 mmol of zinc acetate was dissolved in 5 mL of 1-dodecanethiol (DDT) and 1 mL of oleylamine (OLA) in a 50 mL round bottom flask, and the mixture was degassed under vacuum at 90° C. for 30 minutes. The temperature was then raised to 140° C. until all solid precursors were fully dissolved, typically in less than 15 minutes. Separately, a solution of 1 M OLA/DDT-Se was made by mixing 79 mg selenium powder per 0.75 mL OLA and 0.25 mL DDT at room temperature under argon. The flask was then heated to 170-210° C. under Argon, whereupon 0-3 mL of the 1 M OLA/DDT-Se solution was added dropwise such that the temperature of the reaction mixture did not vary by more than about 3° C. In alternative embodiments, selenium powder was added to the reaction flask at the beginning (with zinc acetate) and OLA/DDT-Se injection was avoided.

The temperature was maintained for ten additional minutes to allow for quantum dot nucleation (this step was sometimes skipped for injections of ≤0.5 mL of OLA/DDT-Se), then the temperature was set to 230° C. for 1-60 minutes, depending on the size desired (for instance, about 10 minutes for 3.5 nm quantum dots). The heating element was then removed and the quantum dots were allowed to cool. The resulting ZnSeS quantum dots were purified by iterative dissolution in chloroform and precipitation with methanol, and then stored in chloroform, octane, or 1-octadecene under inert atmosphere. The reaction is scalable, and typically resulted in more than 90% chemical yield of quantum dots (relative to the Zn precursor).

Example 3

Growth of a $ZnSe_yS_{1-y}$ Shell Around Quantum Dot Cores:

Typically, 1-4 mmol of zinc acetate (depending on desired shell thickness) were dissolved in 5 mL of 1-dodecanethiol (DDT) and 1 mL of oleylamine (OLA) in a 50 mL round bottom flask, and the mixture was degassed under vacuum at 90° C. for 30 minutes. The temperature was then raised to 140° C. until all solid precursors were fully dissolved, typically in less than 15 minutes. Quantum dot cores dissolved in a non-polar solvent such as OLA were then added to the reaction mixture. Separately, a solution of 1 M OLA/DDT-Se was made by mixing 79 mg selenium powder per 0.75 mL OLA and 0.25 mL DDT at room temperature under argon. The flask was then heated to 170-210° C. under Argon, whereupon 0-3 mL of the 1 M OLA/DDT-Se solution was added dropwise such that the temperature of the reaction mixture did not vary by more than about 3° C. In alternative embodiments, OLA/DDT-Se was added to the reaction flask with the quantum dot cores. To avoid the injection of OLA/DDT-Se, selenium powder may be added to the reaction flask at the beginning (with zinc acetate).

The temperature was set to 230° C. for 1-60 minutes, dependent on the desired shell thickness. The heating element was then removed and the quantum dots were allowed to cool. The resulting core/shell quantum dots were purified by iterative dissolution in chloroform and precipitation with methanol, and then stored in chloroform, octane, or 1-octadecene under inert atmosphere. The reaction is scalable, and typically resulted in more than 90% chemical yield of quantum dots (relative to the Zn precursor).

Example 4

Shell formation by cation exchange: For cation exchange with Cd or Zn, a stock solution of 0.5M cadmium oleate or zinc oleate was prepared with 3:1 oleic acid:Cd dissolved in octadecene (from cadmium oxide or zinc acetate). A 1 mL aliquot of quantum dot cores in a non-polar solvent (about 50 mg/ml) was added to 4 mL of 0.5 M cadmium or zinc oleate solution and set to 50-150° C. depending on the desired degree of cation exchange. Cation exchange typically proceeded for 10 minutes. Instead of using oleic acid to form the Cd or Zn oleate used for cation exchange, oleylamine can also be used instead by forming an ammine complex.

Example 5

Synthesis of AgInSeS Quantum Dots:

Typically, 1 mmol of silver iodide and 1 mmol of indium acetate was dissolved in 5 mL of 1-dodecanethiol (DDT) and 1 mL of oleylamine (OLA) in a 50 mL round bottom flask, and the mixture was degassed under vacuum at 90° C. for 30 minutes. The temperature was then raised to 140° C. until all solid precursors were fully dissolved, typically in from greater than 0 to 15 minutes. Separately, a solution of 1 M OLA/DDT-Se was made by mixing 79 mg selenium powder per 0.75 mL OLA and 0.25 mL DDT at room temperature under argon. The flask was then heated to 170-210° C., typically 200° C. under Argon, whereupon 0-3 mL of the 1 M OLA/DDT-Se solution was added dropwise such that the temperature of the reaction mixture did not vary by more than about 3° C. In alternative embodiments, selenium powder is added to the reaction flask at the beginning (with silver iodide and indium acetate).

The temperature was maintained for ten additional minutes to allow for quantum dot nucleation (this step is sometimes skipped for injections of ≤0.5 mL of OLA/DDT-Se), then the temperature was set to 220° C. for 1-60 minutes, depending on the size desired (for instance, about 10 minutes for 3.5 nm quantum dots). The heating element was then removed and the quantum dots were allowed to cool. The resulting AgISeS quantum dots were purified by iterative dissolution in chloroform and precipitation with methanol, and then stored in chloroform, octane, or 1-octadecene under inert atmosphere.

Figure 9:
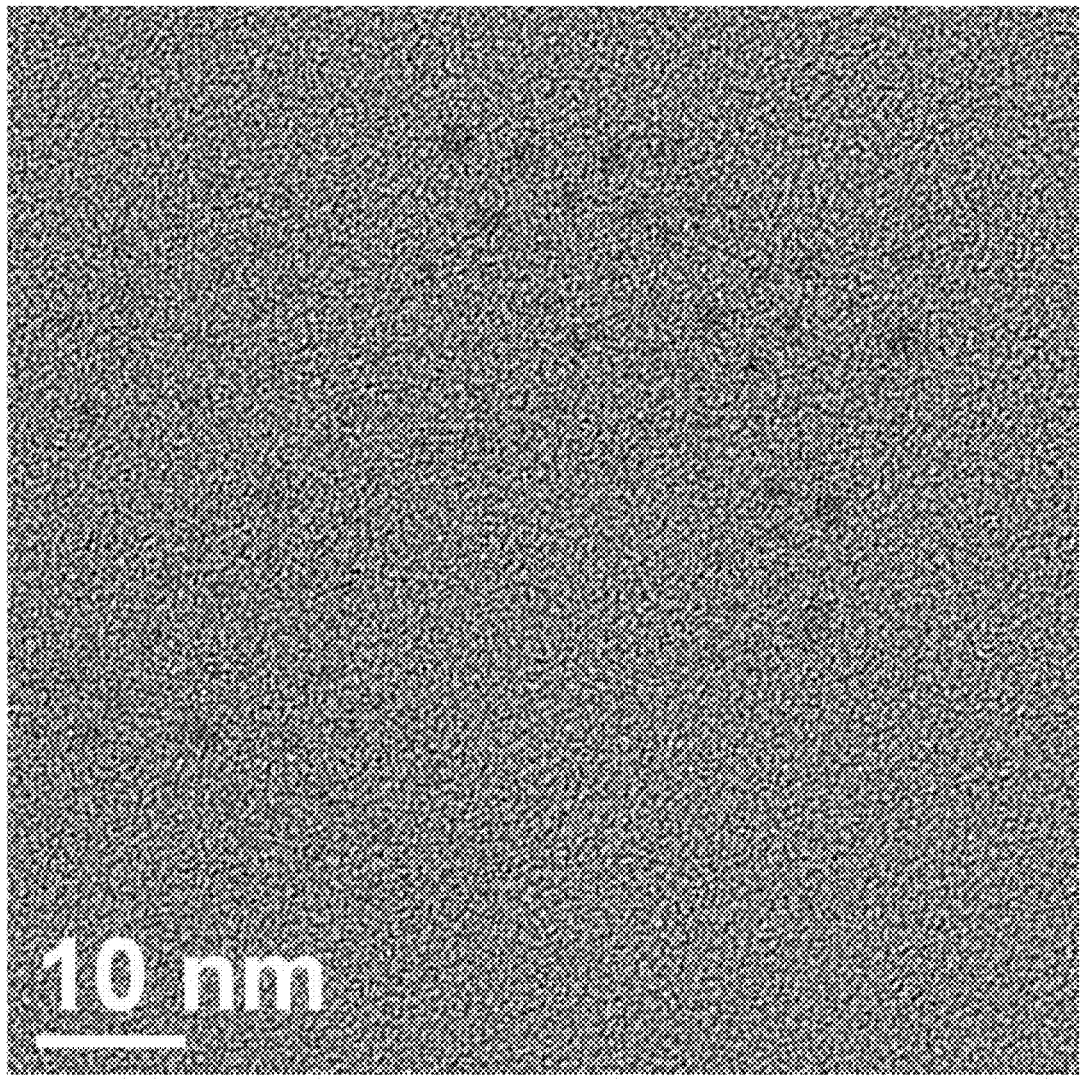
FIG. 9 is a TEM image of $AgInSe_xS_{2-x}$ quantum dots synthesized in oleylamine and 1-dodecanethiol and heated for 5 minutes.

A sample of AgInSeS made by heating at 220° C. for 5 minutes had an absorption edge of about 800 nm and an emission maximum of about 940 nm. The average diameter was 2.50 nm with a 8.9% standard deviation measured by TEM, and the composition was: Ag/In=0.90 and Se/S=1.17 (x=1.08) measured by EDX, equivalent to $Ag_{0.9}In_{1.0}Se_{1.1}S_{0.9}$ (FIG. 9).

Figure 10:
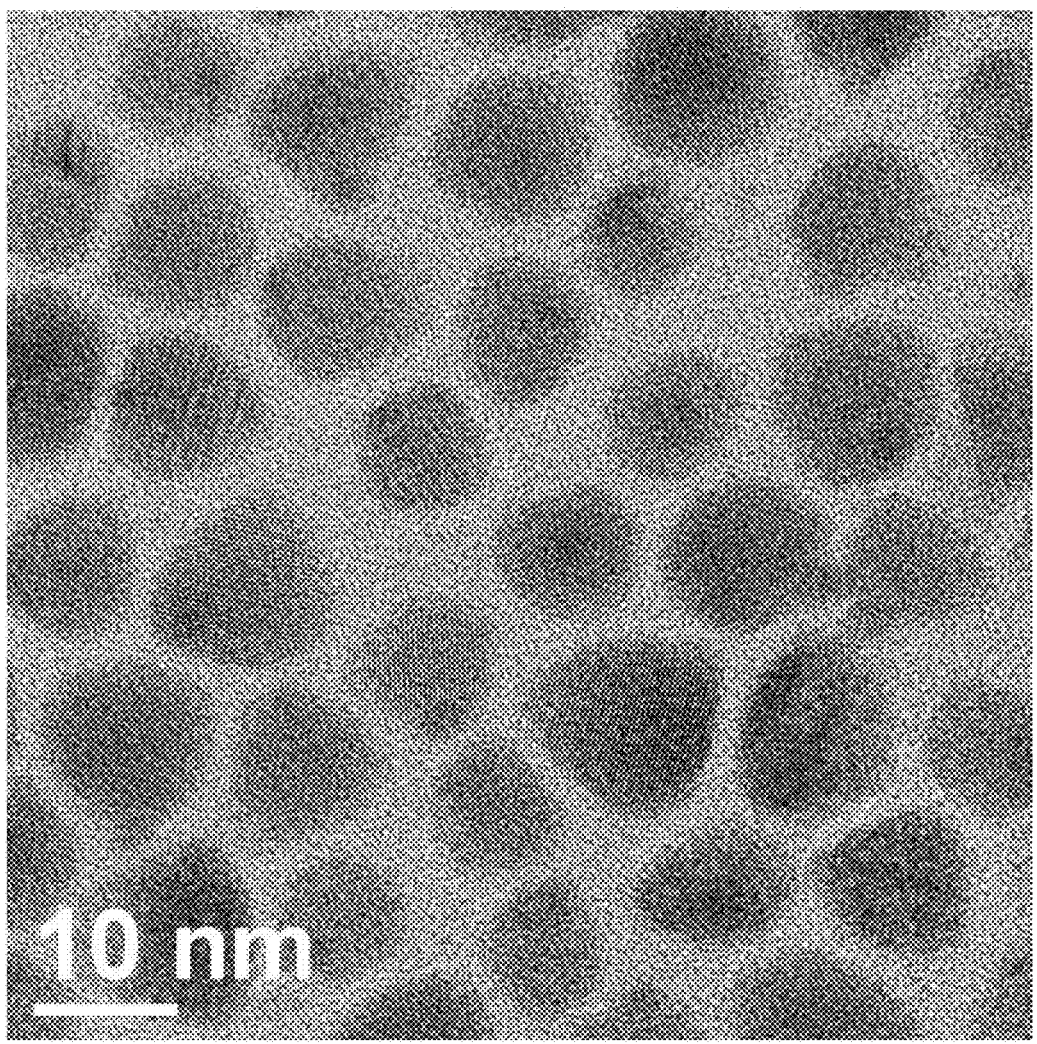
FIG. 10 is a TEM image of $AgInSe_xS_{2-x}$ quantum dots synthesized in oleylamine and 1-dodecanethiol and heated for 15 minutes.

A sample made by heating at 220° C. for 15 minutes had an absorption edge of about 950 nm and an emission maximum of about 1050 nm. The average diameter was 10.9 nm with a 12.6% standard deviation measured by TEM, and the composition was Ag/In=0.94 and Se/S=1.0 (x=1.0) measured by EDX, equivalent to $Ag_{0.9}In_{1.0}Se_{1.0}S_{1.0}$ (FIG. 10).

Example 6

Optical characterization: Optical absorption spectra were measured using an Agilent 8453 spectrophotometer. Photoluminescence spectra were measured using either a 532 nm or 808 nm diode laser for excitation and a liquid nitrogen cooled InSb detector for photoluminescence detection. Absorbtion spectra were recorded using a standard pump-probe configuration with 400-nm, about 100-fs pump pulses (1 kHz repetition rate) and a broad-band, white light supercontinuum probe.

V. Exemplary Embodiments

The following numbered paragraphs illustrate exemplary embodiments of the disclosed technology.

Paragraph 1. A method for making quantum dots, the method comprising:
preparing a solution comprising a first precursor, a second precursor, a thiol and an amine; and
making the quantum dots by heating the solution to a first temperature suitable to incorporate sulfur into the quantum dots.

Paragraph 2. The method of paragraph 1, further comprising maintaining the solution at the first temperature for a first amount of time effective to grow quantum dots of a selected size.

Paragraph 3. The method of paragraph 1, wherein preparing the solution comprises: dissolving the first precursor in a first mixture comprising a first thiol and a first amine to form a first solution;
dissolving the second precursor in a second mixture comprising a second thiol and a second amine to form a second solution;
heating the first solution to a temperature of from 140° C. to 240° C.; and combining the first solution and the second solution.

Paragraph 4. The method of paragraph 3, wherein the first and second solutions are combined at a rate such that the temperature remains substantially the same within the range of 140° C. to 240° C. prior to the combining.

Paragraph 5. The method of paragraph 4, wherein the temperature varies by from 0° C. to 10° C.

Paragraph 6. The method of paragraph 3, wherein the first and second thiols are the same, the first and second amines are the same, or both.

Paragraph 7. The method of paragraph 1, wherein preparing the solution comprises combining the first and second precursors with the thiol and the amine without heating and then heating the combination to a temperature of from 90° C. to 140° C. to form the solution.

Paragraph 8. The method of paragraph 1, wherein making the quantum dots comprises making the quantum dots with a chemical yield of from 90% to 100%.

Paragraph 9. The method of paragraph 1, wherein the first temperature is from 200° C. to 240° C.

Paragraph 10. The method of paragraph 1, wherein the solution is heated to an initial temperature of from 140° C. to 230° C. at a rate sufficient to achieve a selected size standard distribution, prior to being heated to the first temperature.

Paragraph 11. The method of paragraph 10, wherein the standard deviation in at least one dimension is less than 25%.

Paragraph 12. The method of paragraph 10, wherein the quantum dots have a height of less than 20 nm.

Paragraph 13. The method of paragraph 10, wherein the solution is heated to the initial temperature in an amount of time of from greater than 0 to 15 minutes.

Paragraph 14. The method of paragraph 2, wherein the first amount of time is from greater than 0 to 60 minutes.

Paragraph 15. The method of paragraph 1, wherein the method further comprises:
preparing a solution comprising a third precursor;
mixing the quantum dots with the solution to form a mixture; and
heating the mixture within a temperature of from 50° C. to 230° C.

Paragraph 16. The method of paragraph 15, wherein the mixture is heated for a second amount of time suitable to form a shell of a selected thickness.

Paragraph 17. The method of paragraph 16, wherein the second amount of time is greater than 0 to 60 minutes.

Paragraph 18. The method of paragraph 16, wherein the selected shell is greater than a quantum dot core volume.

Paragraph 19. The method of paragraph 15, wherein the third precursor comprises copper, indium, zinc, selenium, cadmium, aluminum, gallium, silver, gold, or combinations thereof.

Paragraph 20. The method of paragraph 1, wherein the first and second precursors comprise copper, indium, gallium, silver, gold, zinc, cadmium, selenium or combinations thereof.

Paragraph 21. The method of paragraph 20, wherein the first and second precursors are each independently elemental metals or metalloids, salts, halides, oxides, or combinations thereof.

Paragraph 22. The method of paragraph 1, wherein the solution comprises a first aliphatic thiol and a first aliphatic amine.

Paragraph 23. The method of paragraph 22, wherein the first aliphatic thiol and the first aliphatic amine each independently have from 1 to 25 carbon atoms.

Paragraph 24. The method of paragraph 23, wherein the first aliphatic thiol is 1-dodecanethiol, 1-undecanethiol, 1-decanethiol, 1-octanethiol, 1-hexadecanethiol or combinations thereof; the first aliphatic amine is oleylamine, octylamine, dodecylamine, hexadecylamine, butylamine, methylamine or combinations thereof; or both.

Paragraph 25. The method of paragraph 24, wherein the solution comprises a second aliphatic thiol, a second aliphatic amine, or both.

Paragraph 26. The method of paragraph 1, wherein:
the first precursor comprises a group 11 metal, group 12 metal, group 13 metal, or a combination thereof;
the second precursor is selenium; and
the quantum dots have a formula $$MSe_xS_{2-x}$$

wherein M is a group 11 metal, group 12 metal, group 13 metal, or a combination thereof, and x is from greater than 0 to 2.

Paragraph 27. A method, comprising:
dissolving selenium and a cation precursor in a mixture of an aliphatic thiol and an aliphatic amine to form a first solution, the aliphatic thiol and aliphatic amine each independently having from 1 to 20 carbon atoms;
heating the first solution to a first temperature of from 140° C. to 230° C. in 15 minutes or less;
maintaining the first solution with a second temperature of from 210° C. to 240° C. for from 1 minute to 60 minutes to form quantum dot cores of a selected size;
dissolving a shell precursor in a second mixture of the aliphatic thiol and the aliphatic amine to form a second solution;
combining the second solution and the quantum dot cores to form a mixture; and
heating the mixture to a third temperature of from 50° C. to 240° C.

Paragraph 28. The method of paragraph 27, wherein:
the cation precursor is copper iodide, zinc acetate, indium acetate, gallium acetate, silver iodide or a combination thereof;
the shell precursor is zinc acetate, cadmium oxide, selenium metal or a combination thereof;
the aliphatic thiol is 1-dodecanethiol; and
the aliphatic amine is oleylamine.

Paragraph 29. A composition made by the method of paragraph 26.

Paragraph 30. The composition of paragraph 29, wherein M is copper, indium, zinc, silver, gold, gallium, cadmium, or combinations thereof.

Paragraph 31. The composition of paragraph 29, further comprising a shell comprising an alloy of sulfur or an alloy of sulfur and selenium.

Paragraph 32. The composition of paragraph 30, wherein M is copper and indium.

Paragraph 33. The composition of paragraph 30, wherein M is zinc.

Paragraph 34. The composition of paragraph 29, having an absorbance onset of from 500 nm to 1200 nm and/or a photoluminescence of from 530 to 1400 nm.

Paragraph 35. A composition, comprising:
quantum dots having a standard deviation in size distribution of less than 25%; and
a core composition according to a formula $$MSe_xS_{2-x}$$

wherein
M is a group IB metal, group IIIB metal, or a combination thereof; and
x is from 0 to 2.

Paragraph 36. The composition of paragraph 35, wherein x is from greater than 1.5 to 2.

Paragraph 37. A method of using the quantum dots made by the method of paragraph 1 in a photovoltaic, solar energy device, lighting device, full-color display, bio-labeling device, biological imaging device, solar cell, light-emitting diode, photosensor, nanostructured electronic array, thin-film display, field-effect transistor or device comprising flexible electronics.

Paragraph 38. A photovoltaic device comprising quantum dots made by the method of paragraph 1.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as the invention all that comes within the scope and spirit of these claims.

I claim:

1. A method for making quantum dots, the method comprising:
    preparing a phosphine-free solution at a temperature suitable to form the solution, the solution comprising
        a first precursor comprising a group 11 metal, group 12 metal, group 13 metal, or a combination thereof;
        a second precursor comprising selenium;
        a thiol; and
        an amine; and
    making the quantum dots by heating the solution to a first temperature for a first amount of time of from greater than 0 minutes to 50 minutes, the first temperature suitable to decompose the thiol and incorporate sulfur into the quantum dots, the quantum dots having a formula $$MSe_xS_{2-x}$$

wherein M is the group 11 metal, group 12 metal group 13 metal, or a combination thereof, and x is from greater than 0 to less than 2.

2. The method of claim 1, wherein the first amount of time is selected to be effective to grow quantum dots of a selected size.

3. The method of claim 1, wherein preparing the solution comprises:
    dissolving the first precursor in a first mixture comprising a first thiol and a first amine to form a first solution;
    dissolving the second precursor in a second mixture comprising a second thiol and a second amine to form a second solution;
    heating the first solution to a temperature of from 140° C. to 240° C.; and
    combining the first solution and the second solution.

4. The method of claim 3, wherein the first and second solutions are combined at a rate such that the temperature remains substantially the same within the range of 140° C. to 240° C. prior to the combining.

5. The method of claim 4, wherein the temperature varies by from 0° C. to 10° C.

6. The method of claim 3, wherein the first and second thiols are the same, the first and second amines are the same, or both.

7. The method of claim 1, wherein preparing the solution comprises combining the first and second precursors with the thiol and the amine without heating and then heating the combination to a temperature of from 90° C. to 140° C. to form the solution.

8. The method of claim 1, wherein making the quantum dots comprises making the quantum dots with a chemical yield of from 90% to 100%.

9. The method of claim 1, wherein the first temperature is from 210° C. to 240° C.

10. The method of claim 1, wherein the temperature suitable to form the solution is from 140° C. to 230° C., and the solution is heated to the temperature suitable to form the solution at a rate sufficient to achieve a selected size standard distribution of the quantum dots, prior to being heated to the first temperature.

11. The method of claim 10, wherein the standard deviation in at least one dimension is less than 25%.

12. The method of claim 10, wherein the quantum dots have a height of less than 20 nm.

13. The method of claim 10, wherein the solution is heated to the temperature suitable to form the solution in an amount of time of from greater than 0 to 15 minutes.

14. The method of claim 1, wherein the first amount of time is from greater than 10 minutes to 30 minutes.

15. The method of claim 1, wherein the method further comprises:
    preparing a solution comprising a third precursor;
    mixing the quantum dots with the solution to form a mixture; and
    heating the mixture within a temperature of from 50° C. to 230° C.

16. The method of claim 15, wherein the mixture is heated for a second amount of time suitable to form a shell of a selected thickness.

17. The method of claim 16, wherein the second amount of time is greater than 0 to 60 minutes.

18. The method of claim 16, wherein the selected shell is greater than a quantum dot core volume.

19. The method of claim 15, wherein the third precursor comprises copper, indium, zinc, selenium, cadmium, aluminum, gallium, silver, gold, or combinations thereof.

20. The method of claim 1, wherein the first and second precursors comprise copper, indium, gallium, silver, gold, zinc, cadmium, selenium or combinations thereof.

21. The method of claim 20, wherein the first and second precursors are each independently elemental metals or metalloids, salts, halides, oxides, or combinations thereof.

22. The method of claim 1, wherein the solution comprises a first aliphatic thiol and a first aliphatic amine.

23. The method of claim 22, wherein the first aliphatic thiol and the first aliphatic amine each independently have from 1 to 25 carbon atoms.

24. The method of claim 23, wherein the first aliphatic thiol is 1-dodecanethiol, 1-undecanethiol, 1-decanethiol, 1-octanethiol, 1-hexadecanethiol or combinations thereof; the first aliphatic amine is oleylamine, octylamine, dodecylamine, hexadecylamine, butylamine, methylamine or combinations thereof; or both.

25. The method of claim 24, wherein the solution comprises a second aliphatic thiol, a second aliphatic amine, or both.

26. The method of claim 1, wherein:
    the first precursor comprises a group 11 metal, group 13 metal, or a combination thereof;
    the second precursor is selenium; and
    the quantum dots have a formula $$MSe_xS_{2-x}$$

wherein M is a group 11 metal, group 13 metal, or a combination thereof, and x is from greater than 0 to less than 2.

27. A method, comprising:
    dissolving selenium and a cation precursor in a mixture of an aliphatic thiol and an aliphatic amine to form a first solution, the aliphatic thiol and aliphatic amine each independently having from 1 to 20 carbon atoms;
    heating the first solution to a first temperature of from 140° C. to 230° C. in 15 minutes or less;

maintaining the first solution with a second temperature of from 210° C. to 240° C. for from 1 minute to 60 minutes to form quantum dot cores of a selected size;

dissolving a shell precursor in a second mixture of the aliphatic thiol and the aliphatic amine to form a second solution;

combining the second solution and the quantum dot cores to form a mixture; and heating the mixture to a third temperature of from 50° C. to 240° C.

28. The method of claim 27, wherein:

the cation precursor is copper iodide, zinc acetate, indium acetate, gallium acetate, silver iodide or a combination thereof;

the shell precursor is zinc acetate, cadmium oxide, selenium metal or a combination thereof;

the aliphatic thiol is 1-dodecanethiol; and the aliphatic amine is oleylamine.

29. A composition made by the method of claim 1, the composition comprising quantum dots having a standard deviation in size distribution of less than 10%.

30. The composition of claim 29, wherein M is copper, indium, zinc, silver, gold, gallium, cadmium, or combinations thereof.

31. The composition of claim 29, further comprising a shell comprising an alloy of sulfur or an alloy of sulfur and selenium.

32. The composition of claim 30, wherein M is copper and indium.

33. A composition having a formula $MSe_yS_{1-y}$ wherein M is zinc, and y is from greater than 0 to less than 1, the composition comprising quantum dots having a standard deviation in size distribution of less than 10%, and wherein the quantum dots are made by a method comprising preparing a phosphine-free solution at a temperature suitable to form the solution, the solution comprising a first precursor comprising zinc;

a second precursor comprising selenium;

a thiol; and an amine; and making the quantum dots by heating the solution to a temperature suitable to decompose the thiol and incorporate sulfur into the quantum dots for an amount of time of from greater than 0 minutes to 50 minutes.

34. The composition of claim 29, having an absorbance onset of from 500 nm to 1200 nm and/or a photoluminescence of from 530 to 1400 nm.

35. A composition, comprising:

quantum dots having a standard deviation in size distribution of less than 10%; and a core composition according to a formula $MSe_xS_{2-x}$ wherein M is a group IB metal, group IIIB metal, or a combination thereof; and x is from greater than 0 to less than 2.

36. The composition of claim 35, wherein x is from greater than 1.5 to less than 2.

37. A photovoltaic device comprising a composition according to claim 29.

* * * * *